Patented Feb. 10, 1953

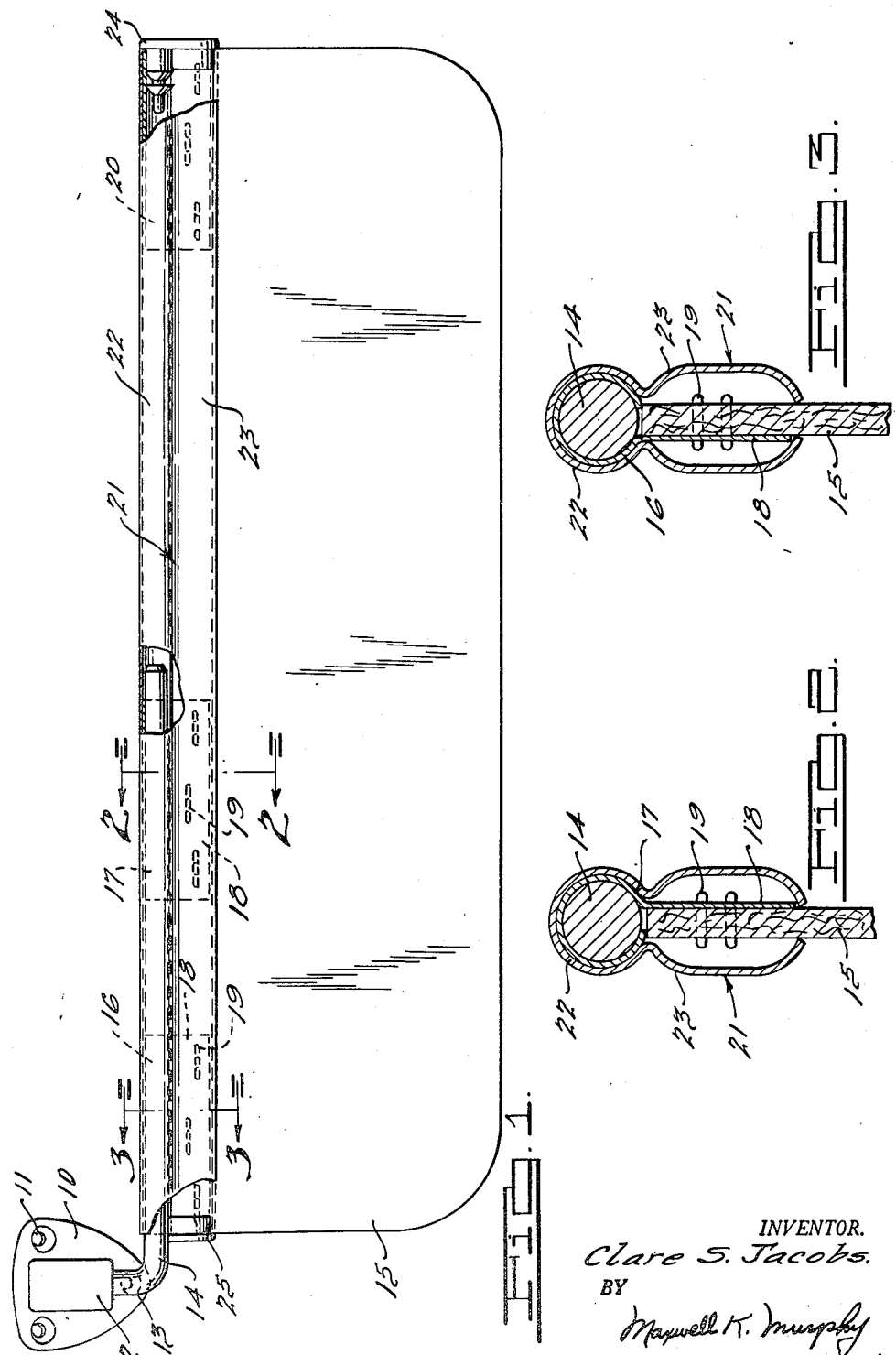

2,628,125

UNITED STATES PATENT OFFICE 2,628,125

SUN VISOR

Clare S. Jacobs, Detroit, Mich., assignor to F. L. Jacobs Co., Detroit, Mich., a corporation of Michigan Application May 9, 1951, Serial No. 225,389

1 Claim. (Cl. 296—97)

This invention relates to sun visors for motor vehicles.

It has become common practice in recent years to provide every motor vehicle with a visor mounted inside the passenger compartment above the windshield. A visor is usually provided on each side of the vehicle and each visor is angularly adjustable to obstruct light rays entering through the windshield or side window.

The principal object of my invention is to provide a low cost visor of pleasing appearance and which possesses all of the advantages of more expensive types.

Another object is to provide, in a low cost visor, ruggedness and anti-rattle characteristics such that the visor is particularly suitable for installation in trucks, busses and the like.

Other objects and advantages will appear from the following description, claim and accompanying drawings.

In the drawings:

Fig. 1 is a side elevation of a complete visor assembly embodying the invention, parts being broken away to show details thereof;

Fig. 2 is a section along the line 2—2 of Fig. 1, showing the relationship of the visor hinge, support rod and shell; and Fig. 3 is a section along the line 3—3 of Fig. 1, showing the relation of the parts at that point.

The visor assembly comprises a bracket 10 which may be secured to the vehicle body on the windshield header or at some other convenient place by means of screws inserted through the holes 11. The bracket provides at 12 a pivotal mounting for one end of the visor support rod 14 whereby the rod may be swung about the axis of its bent portion 13 to a plurality of angular positions.

The visor shield 15 consists of a piece of stiff, lightweight material such as cardboard, wood, plastic or pressed fiber board of the type known under the trade name "Masonite." The latter material is preferred and readily lends itself to the required use.

The shield, in the particular visor being described, may be used without the covering of cloth, leather or the like such as is commonly provided, and it is pivotally mounted on the rod 14 by means of short, tubular hinge members 16, 17. The latter are formed from a piece of flat stock of spring steel in the shape of a split tube with a marginal extension 18.

The extending portions 18 are stapled or otherwise secured to the shield 15 by means of the staples 19. It should be noted that the hinge 16 is wrapped around the rod 14 in one direction and the hinge 17 in the opposite direction. Similarly, the respective marginal extensions are stapled to the shield on opposite sides thereof. This feature is important in the construction and operation of the visor. Heretofore in the art, a single elongated wraparound tube has been used as a hinge, but this has proven unsatisfactory because it requires excessive tension to prevent the shield from falling into obstructing position due to vibration during operation of the vehicle. This is particularly noticeable in instances where the visor is usable in two angular positions, i. e., adjacent the windshield and the side window. When sufficient tension is provided, the wrapping effect of the tube on the rod resists manual rotation of the shield to an undesirable extent.

In my construction, the wrapping friction of one hinge in either direction of rotation of the shield is counterbalanced by an unwrapping of the other hinge; therefore, the tension of both hinge elements may be adjusted to securely retain the visor in inoperative position above either the windshield or side window without rendering it difficult to rotate manually.

In the embodiment shown, the rod 14 is relatively short and does not engage the third hinge element 20 provided at the outer end of the visor assembly. Such a short rod is economical and perfectly satisfactory in the assembly shown which has an outer reinforcing member 21 about to be described. A full length rod may, of course, be provided if desired.

To strengthen and enhance the appearance of the visor, a shell member 21 is telescopically engaged throughout the length of the shield 15. The shell 21 has a rounded portion 22 which snugly engages the tubular portions of the hinge elements 16, 17 and 20 and an oblong portion 23 open at one side which engages the shield 15 throughout its length on both sides thereof at a line adjacent the marginal edges of the extended portions of the hinge elements. The shell 21 is preferably of spring stock and may be painted to match the shield 15 or the vehicle upholstery. It completely covers the hinge elements and the staples and is decorative in effect.

Rubber end plugs 24, 25, cover the opening at each end of the shell.

The visor may be swung about the axis of the rod portion 13 to obstruct light rays entering from the front or side of the vehicle and may be rotated about the axis of the rod 14 to any desired position of adjustment where it will remain until manually rotated to another position.

It will thus be seen that I have provided a low cost visor of rugged construction and pleasing appearance which performs its required function in an improved manner.

I claim:

A vehicle sun visor comprising, in combination, a support rod, a pair of split tubular hinge elements mounted on said rod, said hinge elements having marginal portions extending lengthwise of the rod and projecting generally radially therefrom, said hinge elements being arranged oppositely such that the frictional wrapping actions thereof on said rod are opposed, a shield member secured to said hinge elements, the projecting portions thereof being fastened to opposite sides of said shield, and a shell member telescopically engaged throughout the length of said shield over said hinge elements and rod.

CLARE S. JACOBS.

REFERENCES CITED

The following references are of record in the file of this patent:

UNITED STATES PATENTS

| Number | Name | Date |
|---|---|---|
| 2,340,015 | Pelcher et al. | Jan. 25, 1944 |

FOREIGN PATENTS

| Number | Country | Date |
|---|---|---|
| 342,538 | Great Britain | Feb. 5, 1931 |